United States Patent [19]

Iwai et al.

[11] Patent Number: 5,668,316
[45] Date of Patent: Sep. 16, 1997

[54] VIBRATING GYROSCOPE

[75] Inventors: Kiyoshi Iwai; Jyunichi Hashimoto; Takeshi Nakamura; Yoshiaki Heinouchi; Akira Kumada; Yoshio Kawai; Tsuguji Kanbayashi; Atushi Morikawa, all of Nagaokakyo, Japan

[73] Assignee: Murata Manufacturing Co., Ltd., Kyoto-Fu, Japan

[21] Appl. No.: 699,693

[22] Filed: Aug. 15, 1996

Related U.S. Application Data

[63] Continuation of Ser. No. 360,073, Dec. 20, 1994, abandoned.

[30] Foreign Application Priority Data

Dec. 21, 1993 [JP] Japan .................................. 5-321843
Mar. 4, 1994 [JP] Japan .................................. 6-060250

[51] Int. Cl.⁶ .................................................. G01P 1/02
[52] U.S. Cl. ................................ 73/493; 73/504.14; 73/526
[58] Field of Search .................................. 73/493, 504.04, 73/504.12, 504.13, 504.14, 504.15, 504.16, 431, 526; 310/321, 329, 348, 351

[56] References Cited

U.S. PATENT DOCUMENTS

| | | | |
|---|---|---|---|
| 5,130,600 | 7/1992 | Tomita et al. | 310/329 |
| 5,345,822 | 9/1994 | Nakamura et al. | 73/505 |
| 5,349,856 | 9/1994 | Nakamura | 73/505 |
| 5,548,999 | 8/1996 | Kakizaki et al. | 73/493 |

*Primary Examiner*—John E. Chapman
*Attorney, Agent, or Firm*—Nikaido Marmelstein Murray & Oram LLP

[57] ABSTRACT

A vibrating gyroscope includes a vibrator. The vibrator is installed on a work plate via supporting members. A work cover is installed on the work plate so as to cover the vibrator. The vibrator, the work plate, and the work cover are installed on one main surface of a circuit board. Both end portions of the work cover and both end portions of the circuit board are surrounded by two cushion members. The work cover, the circuit board, and the cushion members are contained in a case. Though bottom faces and top faces of the cushion members respectively touch a surface of a packing on a bottom board of the case and an inside face of a case body, the work cover and the circuit board do not touch the case.

18 Claims, 11 Drawing Sheets

VIBRATING GYROSCOPE

This application is a continuation of application Ser. No. 08/360,073, filed on Dec. 20, 1994, now abandoned.

BACKGROUND OF THE INVENTION

1. Field of the Invention

The present invention relates to a vibrating gyroscope, and more particularly, to a vibrating gyroscope that is applied to a navigation system which detects a position, or that applied to a system for damping a vibration, or the like.

2. Description of the Prior Art

Figure 10:
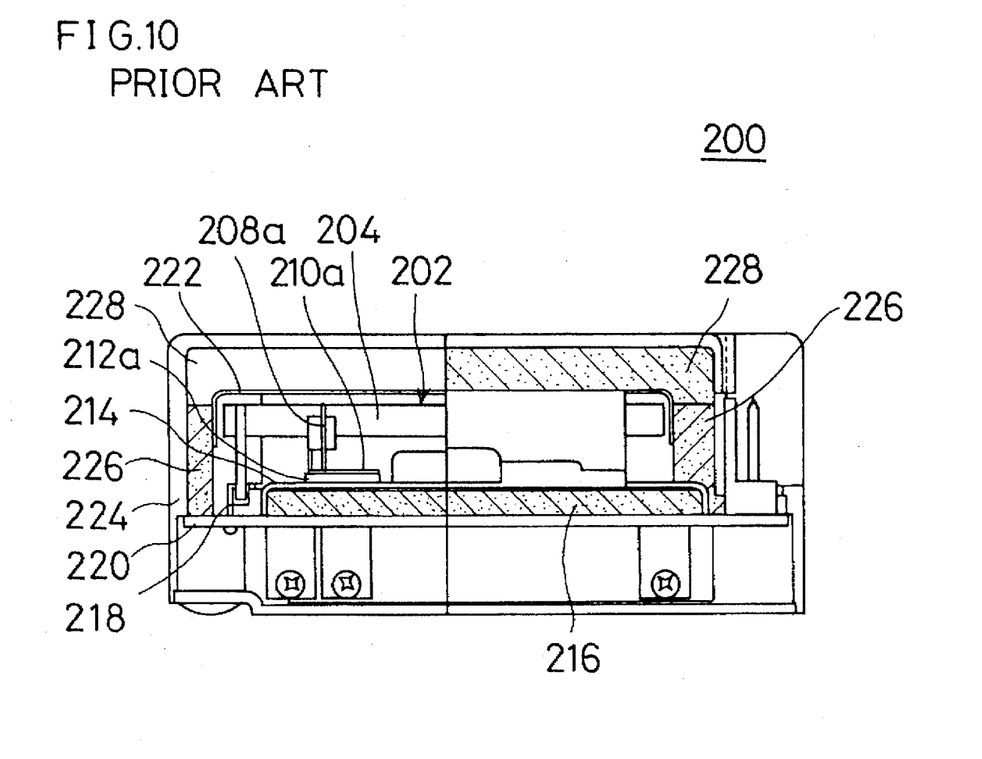
FIG. 10 is a sectional illustrative view showing a prior art of a vibrating gyroscope.

A prior art of a vibrating gyroscope is disclosed in, for example, U.S. Pat. No. 5,545,822. FIG. 10 is a sectional illustrative view showing the prior art vibrating gyroscope, FIG. 11 is an exploded perspective view thereof, FIG. 12 is an exploded perspective view showing an essential portion thereof.

Figure 11:
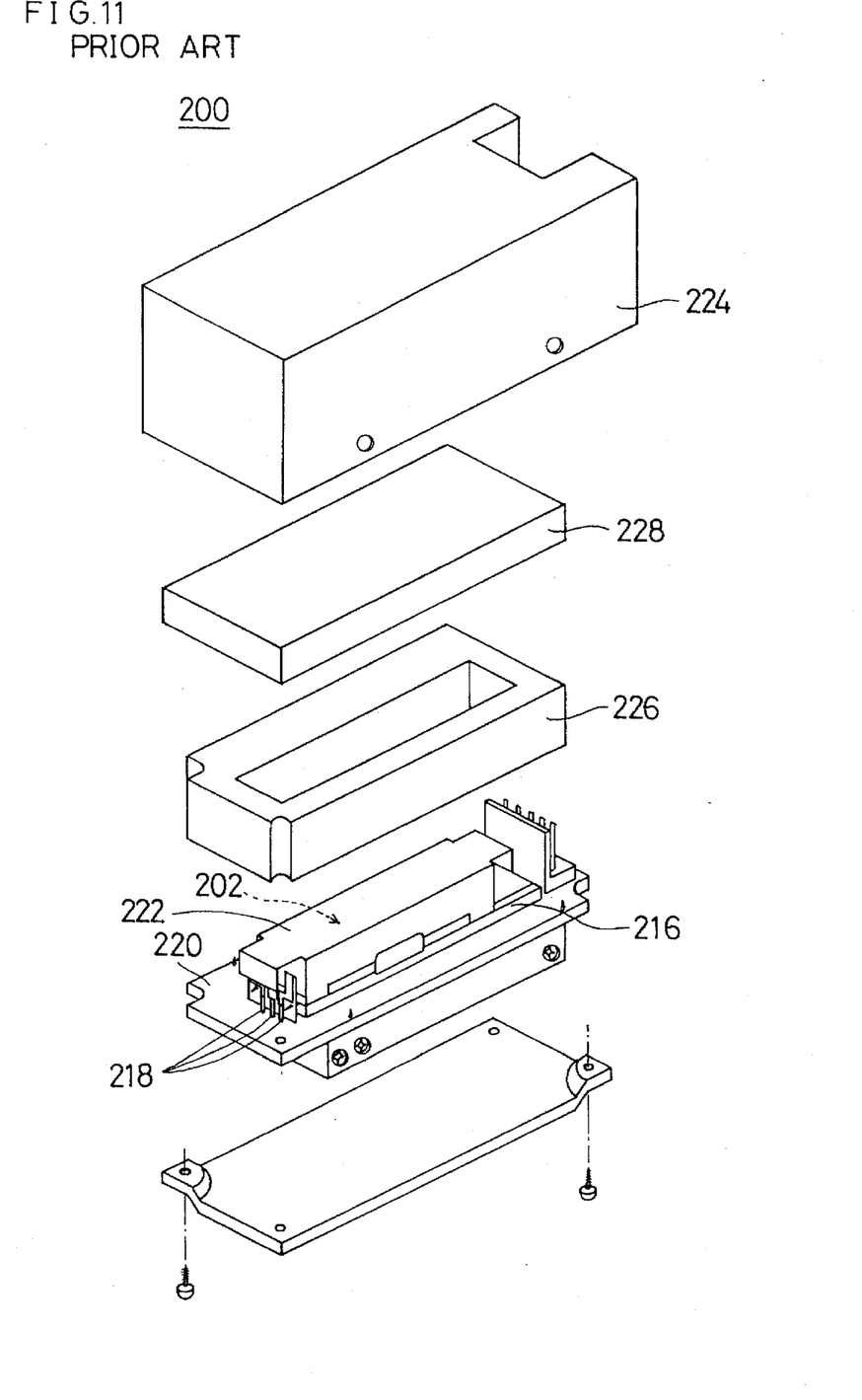
FIG. 11 is an exploded perspective view of the vibrating gyroscope shown in FIG. 10.
Figure 12:
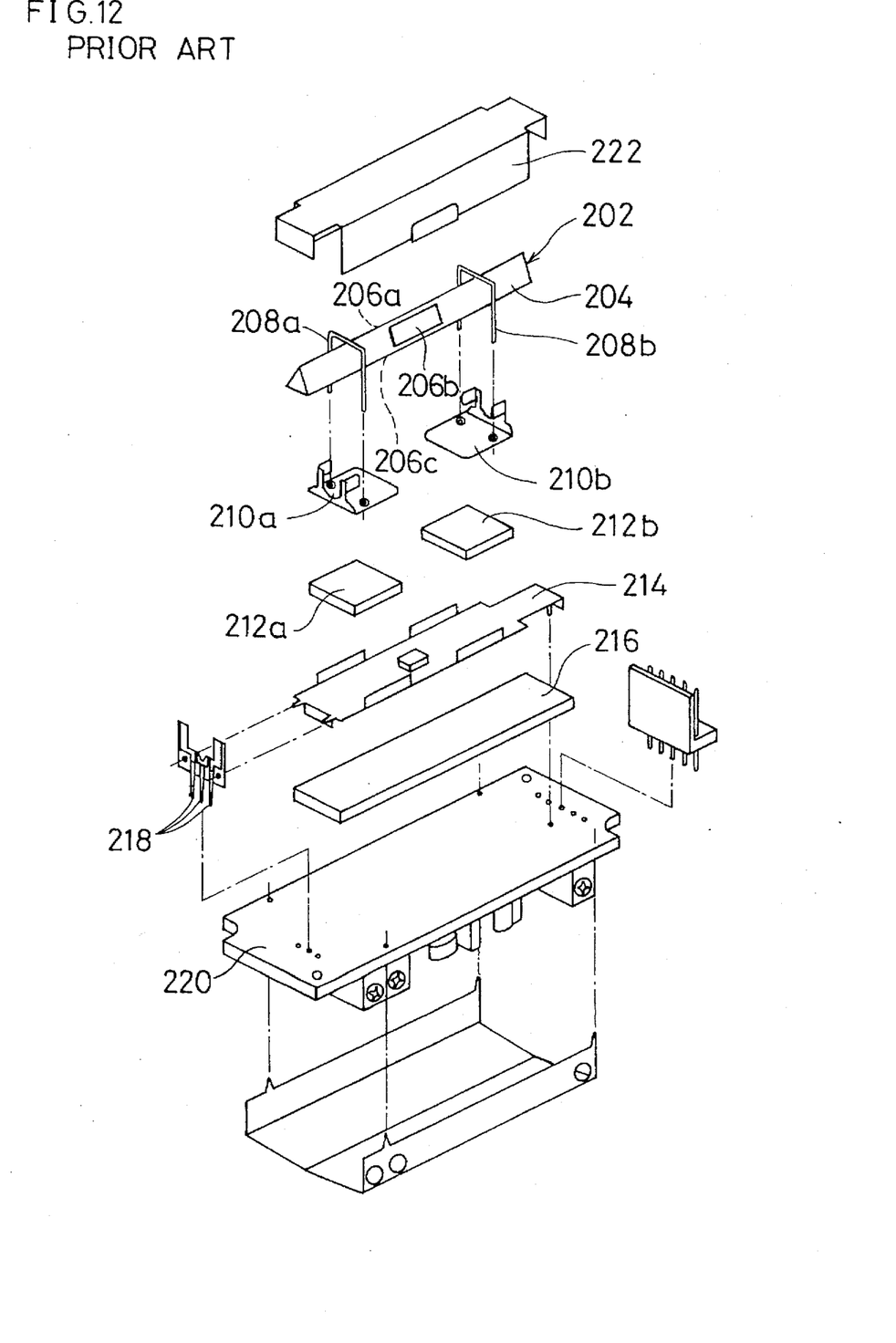
FIG. 12 is an exploded perspective view showing an essential portion of the vibrating gyroscope shown in FIG. 10.

The vibrating gyroscope 200 shown in FIG. 10 through FIG. 12 includes a vibrator 202. The vibrator 202 includes, for example, a regular triangular prism-shaped vibrating body 204. Piezoelectric elements 206a, 206b and 206c are bonded to center portions of three side faces of the vibrating body 204, respectively. These piezoelectric elements 206a–206c respectively include piezoelectric layers consisting of, for example, ceramics, and on both surfaces of the piezoelectric layers, electrodes are respectively formed.

The vibrator 202 is supported by, for example, two U-shaped supporting members 208a and 208b. In this case, center portions of the supporting members 208a and 208b are secured to portions of one ridge-line of the vibrating body 204. Both end portions of the supporting members 208a and 208b are secured to mounting boards 210a and 210b, respectively. These mounting boards 210a and 210b are secured to one main surface of a work plate 214 via cushion members 212a and 212b. The work plate 214 is installed to one main surface of a circuit board 220 via a cushion member 216, lead terminals 218. Furthermore, a work cover 222 is engaged with the work plate 214 so as to cover the vibrator 202.

The vibrator 202 is contained in a case 224. In this case, the other cushion members 226 and 228 are provided around and over the work cover 222 in the case 224. The circuit board 220 is fixed so as to touch the case 224.

An oscillation circuit (not shown) is connected between the piezoelectric elements 206a and 206b and the piezoelectric element 206c. The oscillation circuit causes the vibrating body 204 to bend and vibrate in a direction perpendicular to the main surface of the piezoelectric element 206c. In this state, when a rotation is applied about an axis of the vibrating body 204, the vibrating direction of the vibrating body 204 is changed by the Coriolis force, thereby a difference is generated between output voltages from the piezoelectric elements 206a and 206b. Thus, by measuring the difference between the output voltages, the rotational angular velocity applied to the vibrating gyroscope can be detected.

In the vibrating gyroscope 200 shown in FIG. 10 through FIG. 12, since the cushion members 216, 226 and 228 are provided around the vibrator 202, a vibration from the outside is absorbed by these cushion members 216, 226 and 228, so that the vibration from the outside is hardly transmitted to the vibrator 202. Thus, in the vibrating gyroscope 200, the output characteristic is stable against the vibration from the outside.

However, in the vibrating gyroscope 200 shown in FIG. 10 through FIG. 12, since the vibrator 202 is supported by the circuit board 220 and the circuit board 220 touches the case 224, an impact from the outside such as a fall is applied to the vibrator 202 via the circuit board 220.

In the vibrating gyroscope 200 shown in FIG. 10 through FIG. 12, since the vibrator 202 is loosely installed to the circuit board 220 by the cushion member 216, and the lead terminals 218, when an impact is applied to the vibrator 202, a plastic strain such as twisting is easily generated between the vibrator 202 and the circuit board 220, for example, to the cushion member 216 or the lead terminals 218. When a plastic strain is generated between the vibrator 202 and the circuit board 220, the output characteristic is changed.

Thus, in the vibrating gyroscope 200 shown in FIG. 10 through FIG. 12, the output characteristic is likely to change due to an impact from the outside such as a fall.

In the vibrating gyroscope 200 shown in FIG. 10 through FIG. 12, since the work cover 222 is only engaged with the work plate 214, when a vibration or an impact is applied, the work cover 222 is likely to move or come off. In this case, the inertial force of the vibrator 202 is applied to portions where the vibrator 202 is installed on the supporting members 208a and 208b, the plasticity of the supporting members 208a and 208b is strained, and the support for the vibrator 202 becomes unstable. Consequently, a stable vibration of the vibrator 202 can not be obtained, and a good output characteristic which is sensitive to vibration can not be obtained.

SUMMARY OF THE INVENTION

Therefore, it is a primary object of the present invention to provide a vibrating gyroscope wherein the output characteristic is stable against an impact from the outside such as a fall.

A vibrating gyroscope according to the present invention comprises a vibrator, a circuit board for supporting the vibrator, a case for containing the vibrator and the circuit board therein, and a cushion member provided between the circuit board and the case.

Meanwhile, in the vibrating gyroscope according to the present invention, it may further comprise a work cover provided around the vibrator, installed on the circuit board and contained in the case, and the cushion member may be provided between the circuit board, the work cover and the case.

In the vibrating gyroscope according to the present invention, an impact from the outside such as a fall is absorbed due to the cushion member. Thus, the impact from the outside is hardly applied to the circuit board and the vibrator.

The displacement of the vibrator against the circuit board is restricted due to the work cover. Thus, even if an impact is applied to the vibrator, a plastic strain is barely generated between the vibrator and the circuit board.

According to the present invention, since an impact from the outside such as a fall is not directly applied to the vibrator, a plastic strain is barely generated between the vibrator and the circuit board. Thus, in the vibrating gyroscope according to the present invention, the output characteristic is stable against an impact from the outside such as a fall.

In the vibrating gyroscope according to the present invention, when the device includes the work cover, since a plastic strain is barely generated between the vibrator and the circuit board even if an impact is applied to the vibrator, the output characteristic is stable against a large impact from the outside, too.

It is another object of the present invention to provide a vibrating gyroscope wherein a supporting member is not strained against a vibration or an impact, consequently, a stable vibration can be obtained, and a good output characteristic which is sensitive to vibration can be obtained.

Another vibrating gyroscope according to the present invention comprises a vibrator, a work cover installed around the vibrator, a work plate installed around the vibrator, and a circuit board to which the work cover and the work plate are secured.

Still another vibrating gyroscope according to the present invention comprises a vibrator, a work cover installed around the vibrator, a work plate installed around the vibrator and to which the work cover is secured, and a circuit board to which the work plate is secured.

In another vibrating gyroscope according to the present invention, since the work plate is secured to the circuit board, and the work cover is secured to the circuit board or the work plate, the work cover is not moved or will not come off.

According to the present invention, since the work cover is not moved or will not come off, even if the inertial force of the vibrator is applied by a vibration or an impact occurs to a portion where the vibrator is installed on the supporting member, the work cover will prevent a on strain the plasticity of the supporting member. Consequently, a stable vibration of the vibrator can be obtained, a good output characteristic can be obtained which is sensitive to vibration.

The above and other objects, features, aspects and advantages of the present invention will become more apparent from the following detailed description of the embodiments with reference to the accompanying drawings.

DESCRIPTION OF THE PREFERRED EMBODIMENTS

Figure 1:
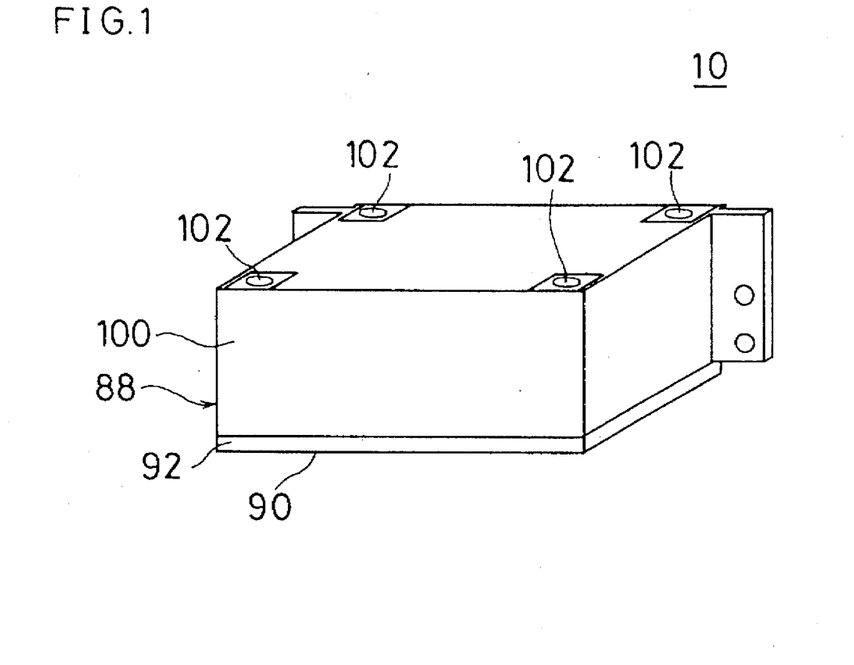
FIG. 1 is a perspective view showing one embodiment of the present invention.
Figure 2:
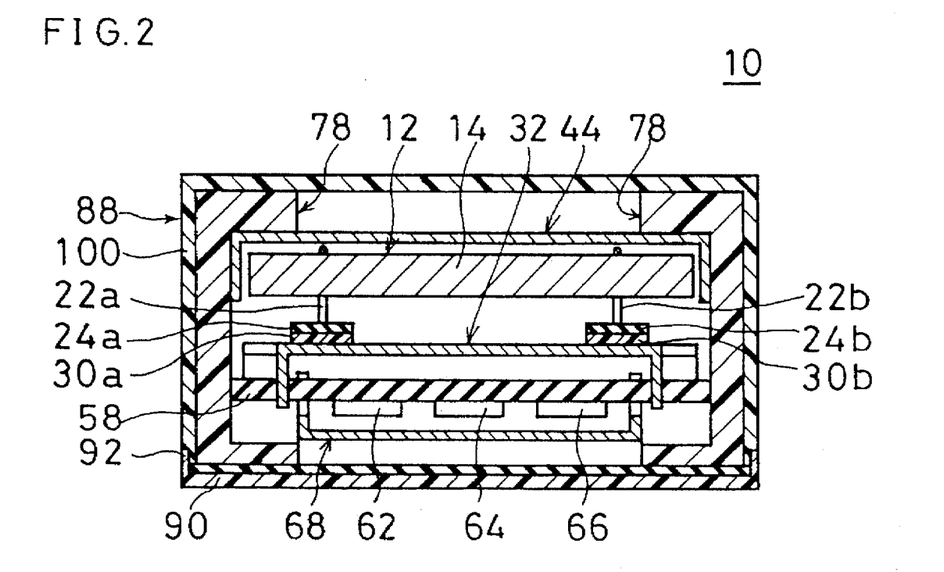
FIG. 2 is a sectional illustrative view of the embodiment shown in FIG. 1.
Figure 3:
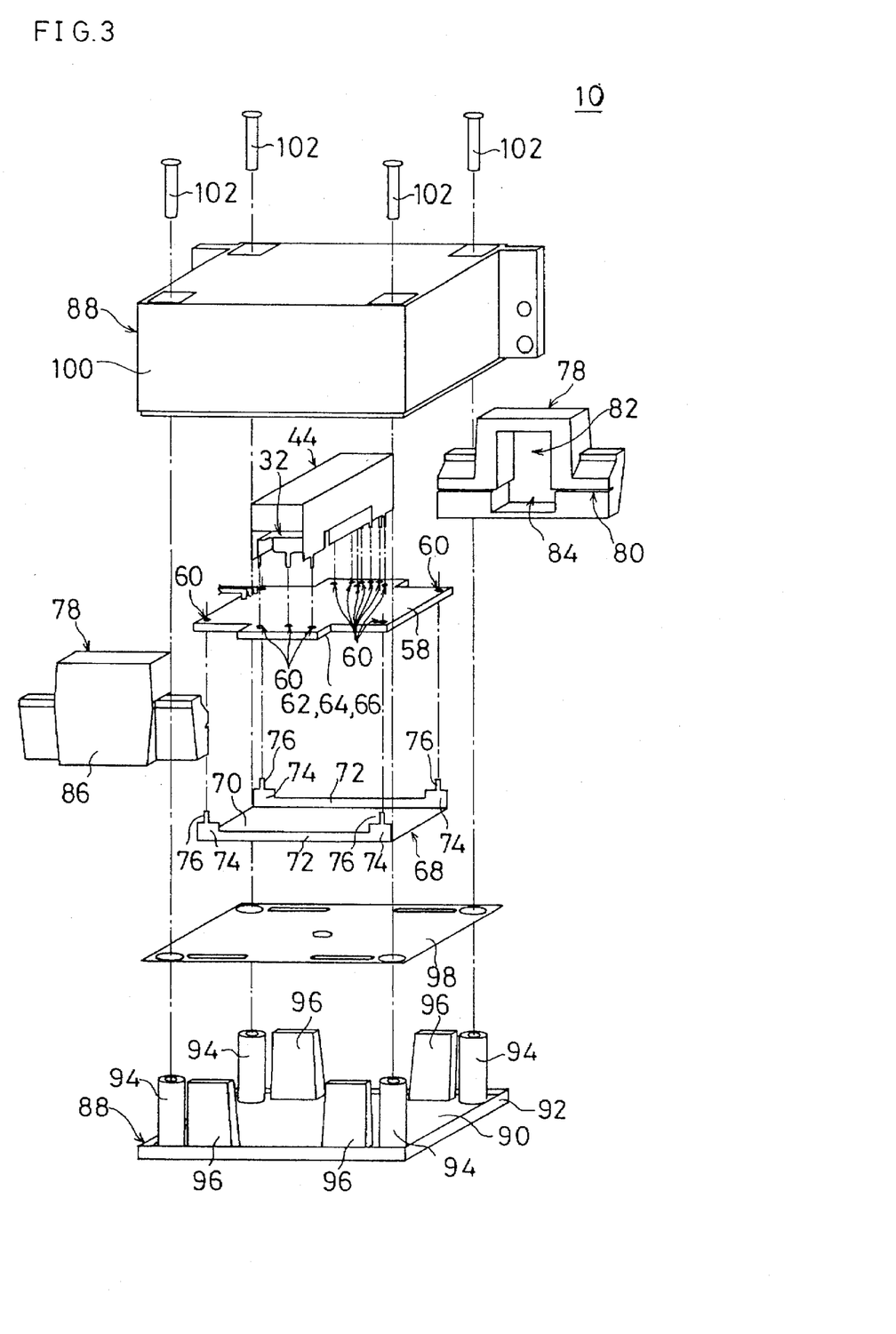
FIG. 3 is an exploded perspective view of the embodiment shown in FIG. 1.
Figure 4:
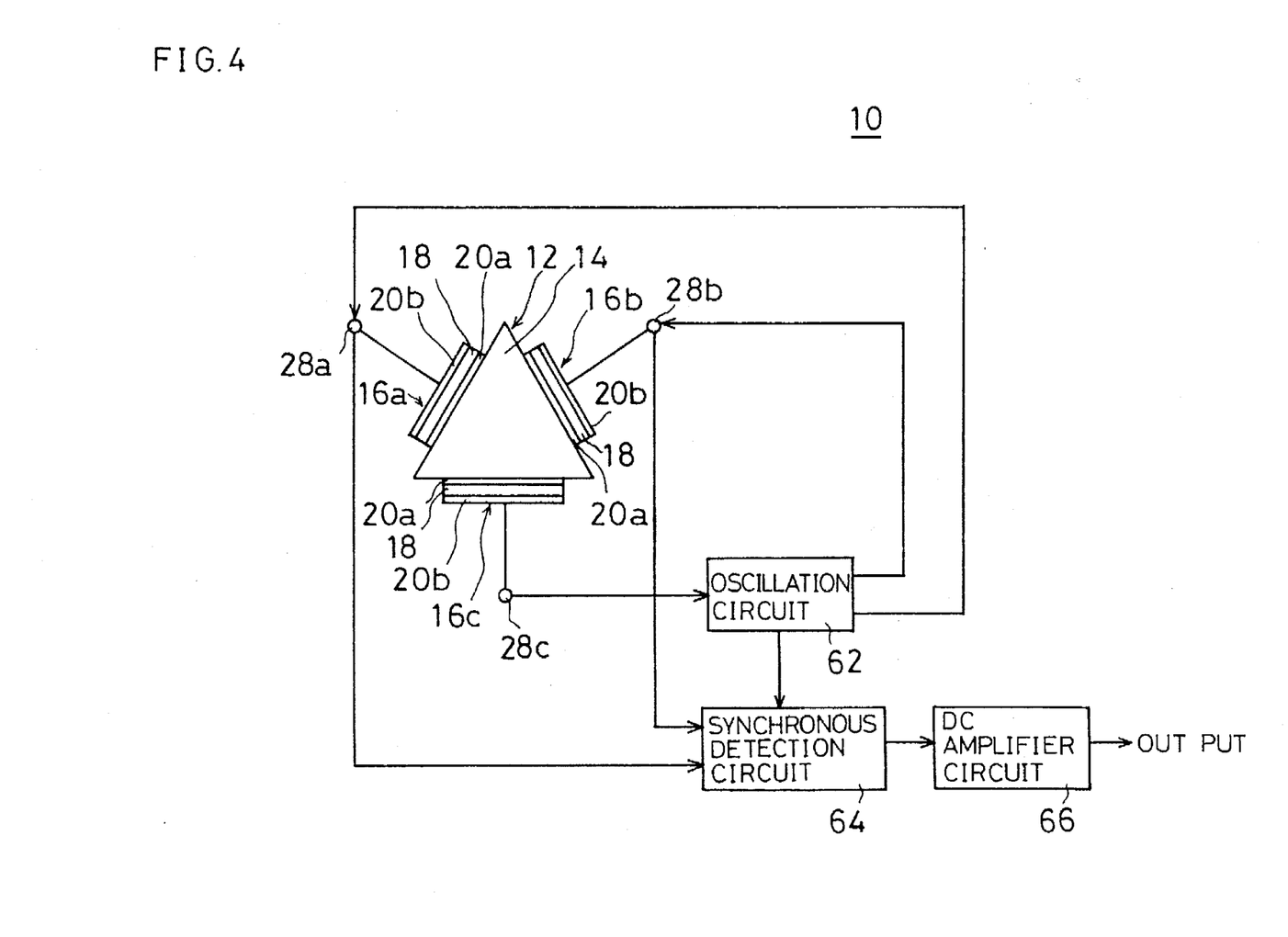
FIG. 4 is a circuit diagram of the embodiment shown in FIG. 1.
Figure 5:
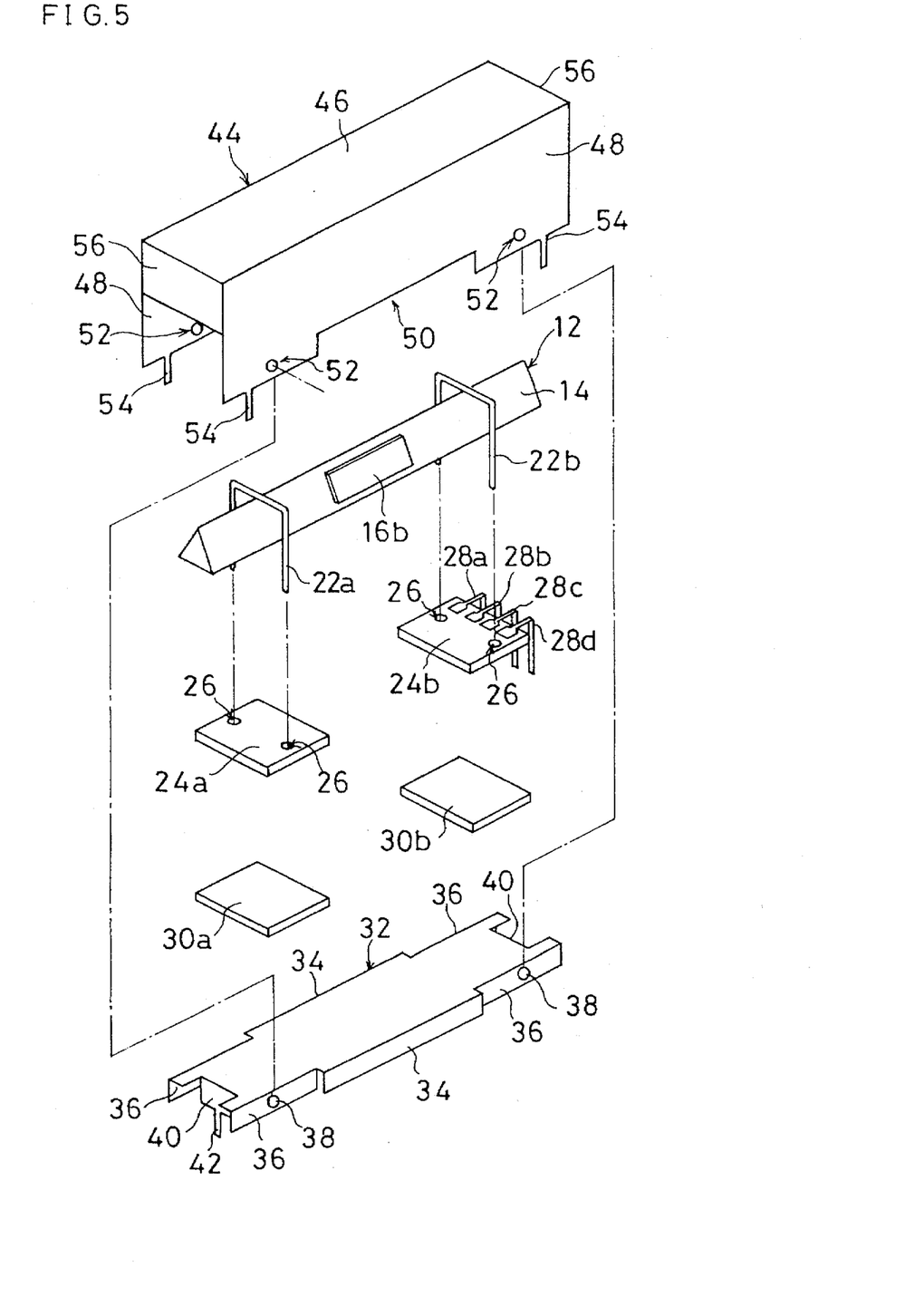
FIG. 5 is an exploded perspective view showing an essential portion of the embodiment shown in FIG. 1.

FIG. 1 is a perspective view showing one embodiment of the present invention, FIG. 2 is a sectional illustrative view thereof, FIG. 3 is an exploded perspective view thereof, FIG. 4 is a circuit diagram thereof, FIG. 5 is an exploded perspective view showing an essential portion thereof.

A vibrating gyroscope 10 includes a vibrator 12. The vibrator 12 includes, for example, a regular triangular prism-shaped vibrating body 14, as particularly shown in FIG. 5. The vibrating body 14 is formed with a constant elastic metal material such as nickel, iron, chromium, titanium or their alloys as elinver, iron-nickel alloy. The vibrating body 14 may be formed with a material which generally generates a mechanical vibration such as quartz, glass, crystal, ceramics besides metal.

As particularly shown in FIG. 4, piezoelectric elements 16a, 16b and 16c are secured to center portions of three side faces of the vibrating body 14, respectively. These piezoelectric elements 16a–16c respectively include piezoelectric layers 18 consisting of, for example, ceramics, and on both surfaces of the piezoelectric layers 18, electrodes 20a and 20b are respectively formed. The three electrodes 20a on one main surface of the piezoelectric elements 16a–16c are bonded to the side faces of the vibrating body 14 by means of, for example, an adhesive. In the embodiment, the two piezoelectric elements 16a and 16b are used for driving to vibrate and to drive the vibrating body 14 and for detecting a displacement of the vibrating body 14, the other piezoelectric element 16c is used for feeding back a driving signal to the two piezoelectric elements 16a and 16b.

As particularly shown in FIG. 2 and FIG. 5, two supporting members 22a and 22b are secured to the vibrator 12. Each of the supporting members 22a and 22b is formed, for example, in a U-shape with a metal wire. Center portions of the supporting members 22a and 22b are secured to portions of one ridge-line of the vibrating body 14 between the two piezoelectric elements 16a and 16b. In this case, the supporting members 22a and 22b are secured in the vicinity of nodal points of the vibrating body 14 so as not to negatively affect the vibration of the vibrating body 14. In this embodiment, the supporting members 22a and 22b are secured to the positions of 0.224 L from both ends of the vibrating body 14, where L represents the length of the vibrating body 14.

Though the supporting members 22a and 22b are secured to the vibrating body 14 by, for example, bonding with an adhesive, soldering or welding, when secured by soldering or welding, taking into account a strength of the supporting member and a solderability and a weldability of the supporting member to the vibrating body, it is preferable to form the supporting member with a wire wherein a metal wire having a large strength such as molybdenum, tungsten or the like is covered with a material having a good solderability and a good weldability such as nickel, platinum, gold, silver, copper, stainless steel, iron or the like.

Both end portions of the supporting members 22a and 22b are respectively secured to, for example, rectangular mounting boards 24a and 24b consisting of an insulating material. That is, two holes 26 are formed to the mounting board 24a, the other two holes 26 are formed to the other mounting board 24b. Both end portions of the supporting member 22a are inserted through the two holes 26 of the mounting board 24a and soldered to a pattern electrode (not shown) on the mounting board 24a. Similarly, both end portions of the other supporting member 22b are inserted through the two holes 26 of the other mounting board 24b and soldered to a pattern electrode (not shown) on the mounting board 24b.

Ends of four lead terminals 28a, 28b, 28c and 28d having, for example, an L-shape are secured to the mounting board 24b at intervals. In this case, the lead terminals 28a–28d are secured so that the other ends extend downward. The three electrodes 20b on the other main surface of the three piezoelectric elements 16a–16c of the vibrator 12 are electrically connected to the lead terminals 28a–28c by lead wires (not shown), respectively. The supporting member 22b is electrically connected to the other lead terminal 28d by a pattern electrode (not shown) on the mounting board 24b.

The mounting boards 24a and 24b are bonded by cushion members 30a and 30b at intervals on one main surface of, for example, a rectangular work plate 32. Each of the cushion members 30a and 30b is formed with a material consisting of rubber such as ethylene propylene rubber, silicone rubber or butyl rubber, or a synthetic resin such as urethane, which is foamed such that respective cells of the foam do not cohere to each other or foamed into closed cells.

Flanges 34 having, for example, an L-shaped section are formed to center portions of both sides of the work plate 32, respectively. Holding members 36 extended downward are formed to both ends of both sides of the work plate 32, respectively. Projections 38 outwardly projected are formed to center portions of the holding members 36, respectively. Leg members 40 extended downward are formed to longitudinal both ends of the work plate 32, respectively. Projections 42 extended downward are formed to bottom ends of the leg members 40, respectively. The work plate 32 is formed with a material having a magnetism and a conductivity such as iron plated with solder, iron plated with tin, an alloy included 42% nickel or the like.

A work cover 44 is installed on the work plate 32 so as to cover the vibrator 12. The work cover 44 includes a rectangular surface member 46. Side members 48 extended downward are formed on both sides of the surface member 46, respectively. Cutout portions 50 are formed to center portions of the bottom portions of the side members 48 so as to correspond with the flanges 34 of the work plate 32, respectively. Holes 52 are formed on both side portions of the side members 48 so as to correspond with the projections 38 of the work plate 32, respectively. Projections 54 extended downward are formed on both sides of the bottom portions of the side members 48, respectively. Protective members 56 extended downward are formed on longitudinal ends of the surface member 46, respectively. The work cover 44 is formed with a material having a magnetism and a conductivity such as iron plated with solder, iron plated with tin, an alloy included 42% nickel or the like.

The side members 48 of the work cover 44 are engaged outside the holding members 36 of the work plate 32. At the same time, the flanges 34 and the projections 38 of the work plate 32 are engaged to the cutout portions 50 and the holes 52 of the work cover 44, respectively. Thus, the work cover 44 is strongly installed on the work plate 32. The surface member 46, the side members 48 and the protective members 56 of the work cover 44 are positioned in the vicinity of the vibrator 12 with a distance of, for example, 0.5 mm from the vibrator 12. The surface member 46, the side members 48 and the protective members 56 of the work cover 44 are designed to protect the supporting members 22a and 22b against plastic strain by not allowing the vibrator 12 to displace unnecessarily.

As shown in FIG. 2 and FIG. 3, the vibrator 12, the work plate 32, and the work cover 44 are installed on one main surface of, for example, a cross-shaped circuit board 58. That is, many holes 60 are formed on the circuit board 58 so as to correspond with the other ends of the lead terminals 28a–28d, the projections 42 of the work plate 32 and the projections 54 of the work cover 44. The other ends of the lead terminals 28a–28d, the projections 42 of the work plate 32 and the projections 54 of the work cover 44 are inserted through the holes 60 of the circuit board 58 and soldered to pattern electrodes (not shown) on the circuit board 58, respectively. Thus, the vibrator 12, the work plate 32, and the work cover 44 are strongly installed on the circuit board 58.

An oscillation circuit 62, a synchronous detection circuit 64 and a DC amplifier circuit 66 are arranged on the other main surface of the circuit board 58. Meanwhile, another circuit, another component and so on are arranged on the one main surface of the circuit board 58.

The oscillation circuit 62 is for generating a driving signal for driving and vibrating the vibrator 12, and includes a crystal for stabilizing an oscillation frequency and a phase correcting circuit for adjusting the oscillation frequency. An input terminal of the oscillation circuit 62 is electrically connected to the electrode 20b of the piezoelectric element 16c of the vibrator 12 via a pattern electrode (not shown) on the circuit board 58, and the lead terminal 28c. Two output terminals of the oscillation circuit 62 are respectively connected to the electrodes 20b of the piezoelectric elements 16a and 16b via pattern electrodes (not shown) on the circuit board 58, and the lead terminals 28a and 28b. The oscillation circuit 62 causes the vibrating body 14 bend and vibrate in a direction perpendicular to the main surface of the piezoelectric element 16c. In this state, when a rotation is applied about an axis of the vibrating body 14, the vibrating direction of the vibrating body 14 is changed by the Coriolis force, thereby a difference is generated between output voltages of the piezoelectric elements 16a and 16b. Thus, by measuring the difference between the output voltages, the rotational angular velocity applied to the vibrating gyroscope can be detected.

The synchronous detection circuit 64 is for detecting a signal of a difference between two signals obtained from the piezoelectric elements 16a and 16b in synchronous with the driving signal, and consists of, for example, a differential amplifier, and a switching element. Two input terminals of the synchronous detection circuit 64 are respectively connected to the electrodes 20b of the piezoelectric elements 16a and 16b via pattern electrodes (not shown) on the circuit board 58, and the lead terminals 28a and 28b. Another input terminal of the synchronous detection circuit 64 is connected to another output terminal of the oscillation circuit 62 via a pattern electrode (not shown) on the circuit board 58.

The DC amplifier circuit 66 is for smoothing and amplifying an output signal from the synchronous detection circuit 64, and consists of, for example, a smoothing circuit, and an amplifier circuit. An input terminal of the DC amplifier circuit 66 is connected to an output terminal of the synchronous detection circuit 64 via a pattern electrode (not shown) on the circuit board 58.

A shield cover 68 is installed to the other main surface of the circuit board 58 so as to cover the oscillation circuit 62, the synchronous detection circuit 64 and the DC amplifier circuit 66. The shield cover 68 includes a surface member 70. Side members 72 are formed on both sides of the surface member 70, respectively. Leg members 74 are respectively formed on both ends of the side members 72. Projections 76 are formed on the leg members 74, respectively. The shield cover 68 is formed with a material having a conductivity such as nickel silver, phosphor bronze, tin plate or the like. The projections 76 of the shield cover 68 are inserted through the holes 60 of the circuit board 58, and soldered to pattern electrodes (not shown) on the circuit board 58, respectively. Thus, the shield cover 68 is strongly installed on the circuit board 58.

Both end portions of the work cover 44 and both end portions of the circuit board 58 are respectively surrounded by, for example, two convex cushion members 78. In this case, a groove 80 corresponding to the end portion of the circuit board 58 and a recess 82 corresponding to the end portion of the work cover 44 are formed on one main surface of the cushion member 78. Both end portions of the circuit board 58 and both end portions of the work cover 44 are respectively inserted into the grooves 80 and the recesses 82 of the two cushion members 78. Meanwhile, another recess 84 is formed under the recess 82 on the one main surface of the cushion member 78 as a space for the lead terminals, and the projections are projected on the other main surface of the circuit board 58. On the other main surface of the cushion member 78, both end portions thereof are dented, a projection 86 is formed on the center thereof. Each of the cushion members 78 is formed with a material consisting of rubber such as ethylene propylene rubber, silicone rubber or butyl rubber, or a synthetic resin such as urethane, which is foamed such that respective cells of the foam do not cohere to each other or foamed into closed cells, the same as the above-mentioned cushion members 30a and 30b.

The work cover 44, the circuit board 58, and the cushion members 78 are contained in a case 88 consisting of a synthetic resin such as polybutylene terephthalate (PBT), polyphenylene oxide (PPO) or polyphenylene sulfide (PPS). The case 88 includes a rectangular bottom board 90. The bottom board 90 has an edge portion 92 projected on one main surface thereof. Pillars 94 having a screw hole are respectively formed on four corners on one main surface of the bottom board 90, holding pieces 96 are respectively formed in the vicinity of the pillars 94. A sheet packing 98 consisting of, for example, rubber is arranged inside the edge portion 92 on the one main surface of the bottom board 90. In this case, the packing 98 has holes corresponding to the pillars 94 and the holding pieces 96, the pillars 94 and the holding pieces 96 are inserted through the holes. Projections 86 of the two cushion members 78 are respectively inserted between the two holding pieces 96 and the other two holding pieces 96. A box case body 100 is installed on the bottom board 90 so as to cover the work cover 44, the circuit board 58, and the cushion members 78. In this case, the case body 100 and the four pillars 94 of the bottom board 90 are secured by four screws 102. Though bottom faces and top faces of the cushion members 78 respectively touch a surface of the packing 98 and an inside face of the case body 100, the work cover 44, the circuit board 58 and the shield cover 68 do not touch the case 88.

In the vibrating gyroscope 10, since the cushion members 78 are provided between the circuit board 58 and the case 88, an impact from the outside such as a fall is absorbed by the cushion members 78. Thus, an impact from the outside such as a fall is hardly applied to the vibrator 12 and the circuit board 58. Thus, in the vibrating gyroscope 10, the output characteristic is stable against an impact from the outside such as a fall.

In the vibrating gyroscope 10, since the work cover 44 is provided around the vibrator 12, even if an impact such as a fall is applied to the vibrator 12, a plastic strain is hardly generated between the vibrator 12 and the circuit board 58, for example, to the supporting members 22a and 22b. Thus, in the vibrating gyroscope 10, the output characteristic is stable against a large impact from the outside such as a fall, too.

In the vibrating gyroscope 10, since the work plate. 32 and the work cover 44 are strongly secured to the circuit board 58, the work plate 32 and the work cover 44 are not moved or will not come off against a large impact from the outside such as a fall.

A table 1 shows results when an impact is applied to the vibrating gyroscope 10 by dropping the vibrating gyroscope 10 from a height of 1 meter.

A table 2 shows results when an impact is applied to the vibrating gyroscope 200 shown in FIG. 10 through FIG. 12 by dropping the vibrating gyroscope 200 from a height of 50 centimeters.

In the table 1 and the table 2, "OUTPUT AT STANDSTILL (V)" represents a voltage (V) of an output really obtained from the vibrating gyroscope at standstill, "CHANGING RATE OF OUTPUT AT ROTATION (%)" represents a changing rate (%) of an output really obtained from the vibrating gyroscope at rotation.

In the prior art vibrating gyroscope 200 shown in FIG. 10 through FIG. 12, as shown in the results shown in the table 2, when only falling from a height of 50 centimeters three times, the oscillation is stopped and an output is not obtained at rotation. On the other hand, in the embodiment vibrating gyroscope 10, as shown in the results shown in the table 1, even if falling from a height of 1 meter six times, outputs at standstill and rotation are stable.

In the vibrating gyroscope 10, since the work plate 32 and the work cover 44 are provided around the vibrator 12 as shield members consisting of a material having a magnetism, the vibrator 12 is magnetically shielded against the outside, deterioration to the output characteristic by the outside magnetism is provided.

In the vibrating gyroscope 10, since the vibrator 12 provided on one main surface of the circuit board 58 is electrically connected to the oscillation circuit 62 and the synchronous detection circuit 64 on the other main surface of the circuit board 58 via the lead terminals 28a–28c, it is unnecessary to stretch any lead wire from one main surface to the other main surface of the circuit board 58.

In the vibrating gyroscope 10, since the shield cover 68 consisting of a material having a conductivity is provided so as to cover the oscillation circuit 62, an effect of a high-frequency noise generated from the oscillation circuit 62 and an effect of an outside noise can be prevented.

Meanwhile, in the vibrating gyroscope 10 shown in FIG. 1 through FIG. 5, though the two convex cushion members 78 are provided between the work cover 44, the circuit board 58, the case 88 and so on, another-shaped cushion member may be provided. A cushion member is provided only between the circuit board 58 and the case 88.

Figure 6:
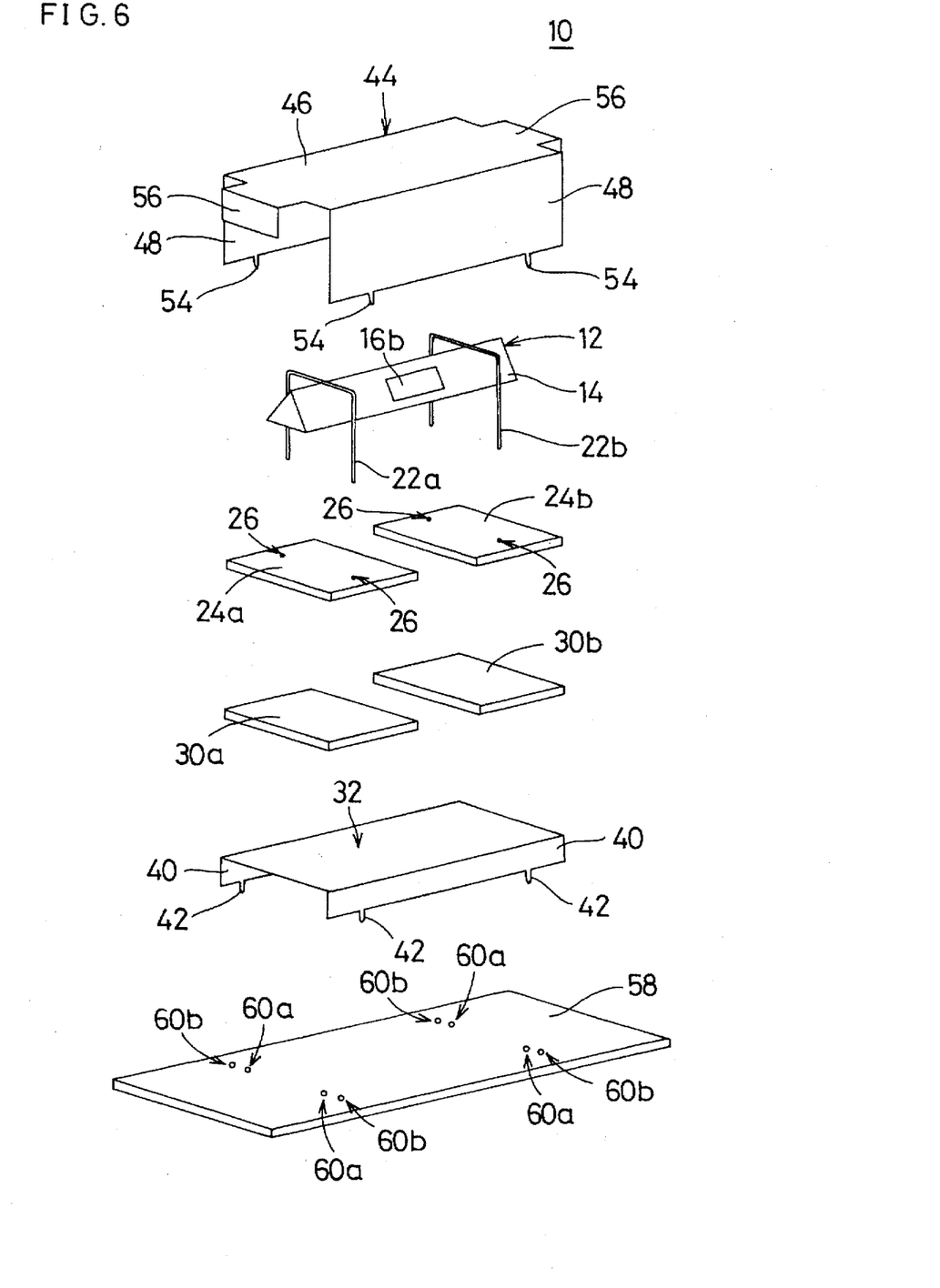
FIG. 6 is an exploded perspective view showing an essential portion of another embodiment of the present invention.
Figure 7:
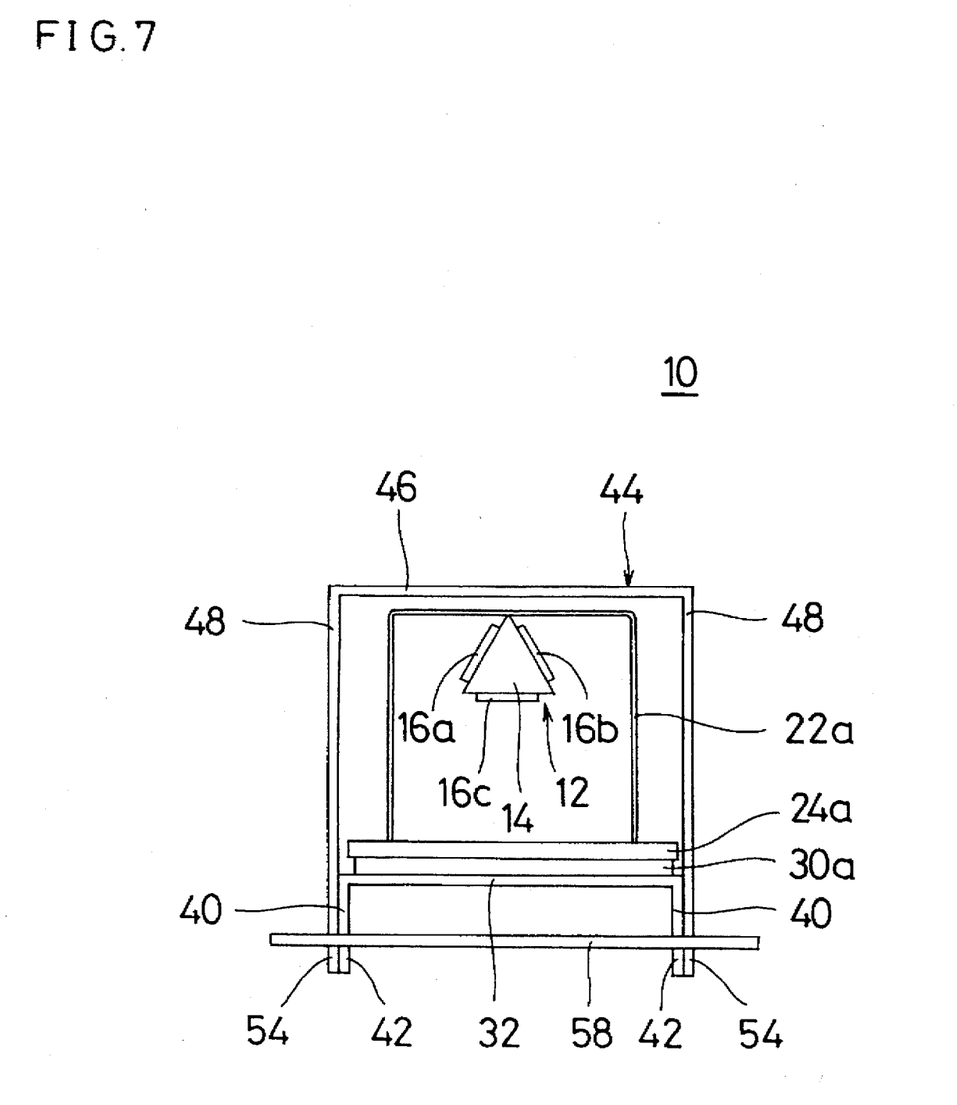
FIG. 7 is a front illustrative view showing an essential portion of the embodiment shown in FIG. 6.

FIG. 6 is an exploded perspective view showing an essential portion of another embodiment of the present invention, FIG. 7 is a front illustrative view showing an essential portion of the embodiment shown in FIG. 6. In the embodiment shown in FIG. 6 and FIG. 7, compared with the embodiment shown in FIG. 1 through FIG. 5, leg members 40 extended downward are respectively formed on both sides of a work plate 32. Projections 42 extended downward are respectively formed on both sides of bottom portions of the leg members 40. The work plate 32 is installed on one main surface of a circuit board 58. In this case, the projections 42 of the work plate 32 are inserted through holes 60a formed on the circuit board 58, and secured to a ground pattern (not shown) on the other main surface of the circuit board 58 by soldering. Thus, the work plate 32 is strongly installed on the circuit board 58.

Furthermore, a work cover 44 is installed on the circuit board 58 so as to be positioned outside the work plate 32. In this case, projections 54 of the work cover 44 are inserted through holes 60b formed on the circuit board 58, and secured to a ground pattern (not shown) on the other main surface of the circuit board 58 by soldering. Thus, the work cover 44 is strongly installed on the circuit board 58, too.

In the vibrating gyroscope 10 shown in FIG. 6 and FIG. 7, since the work cover 44 is provided around the vibrator 12, even if an impact such as due to a fall is applied to the vibrator 12, a plastic strain is hardly generated between the vibrator 12 and the circuit board 58, for example, to the supporting members 22a and 22b. Thus, in the vibrating gyroscope 10, the output characteristic is stable against a large impact from the outside such as a fall.

Furthermore, in the vibrating gyroscope 10 shown in FIG. 6 and FIG. 7, since the work plate 32 and the work cover 44 are strongly secured to the circuit board 58, the work plate 32 and the work cover 44 will not moved or are not come off against a large impact from the outside such as a fall.

Meanwhile, though the work plate 32 and the work cover 44 are secured to the circuit board 58 by soldering in each embodiment shown in FIG. 1 through FIG. 7, a method for securing is not limited to the embodiments, it may use another method such as welding, bonding, or engaging by inserting the projections 42 of the work plate 32 and the projections 54 of the work cover 44 through the holes of the circuit board 58 thereafter bending.

Figure 8:
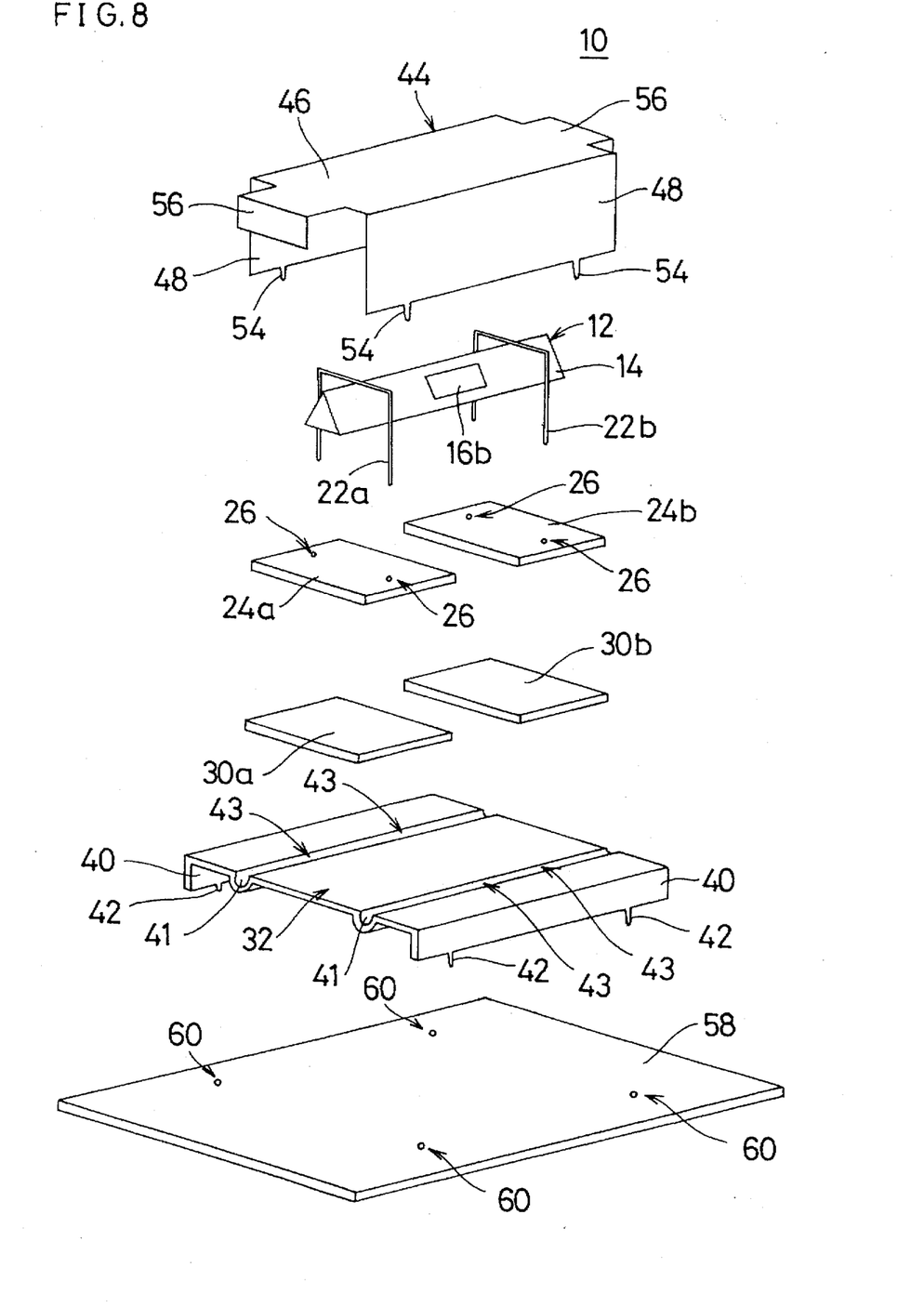
FIG. 8 is an exploded perspective view showing an essential portion of still another embodiment of the present invention.
Figure 9:
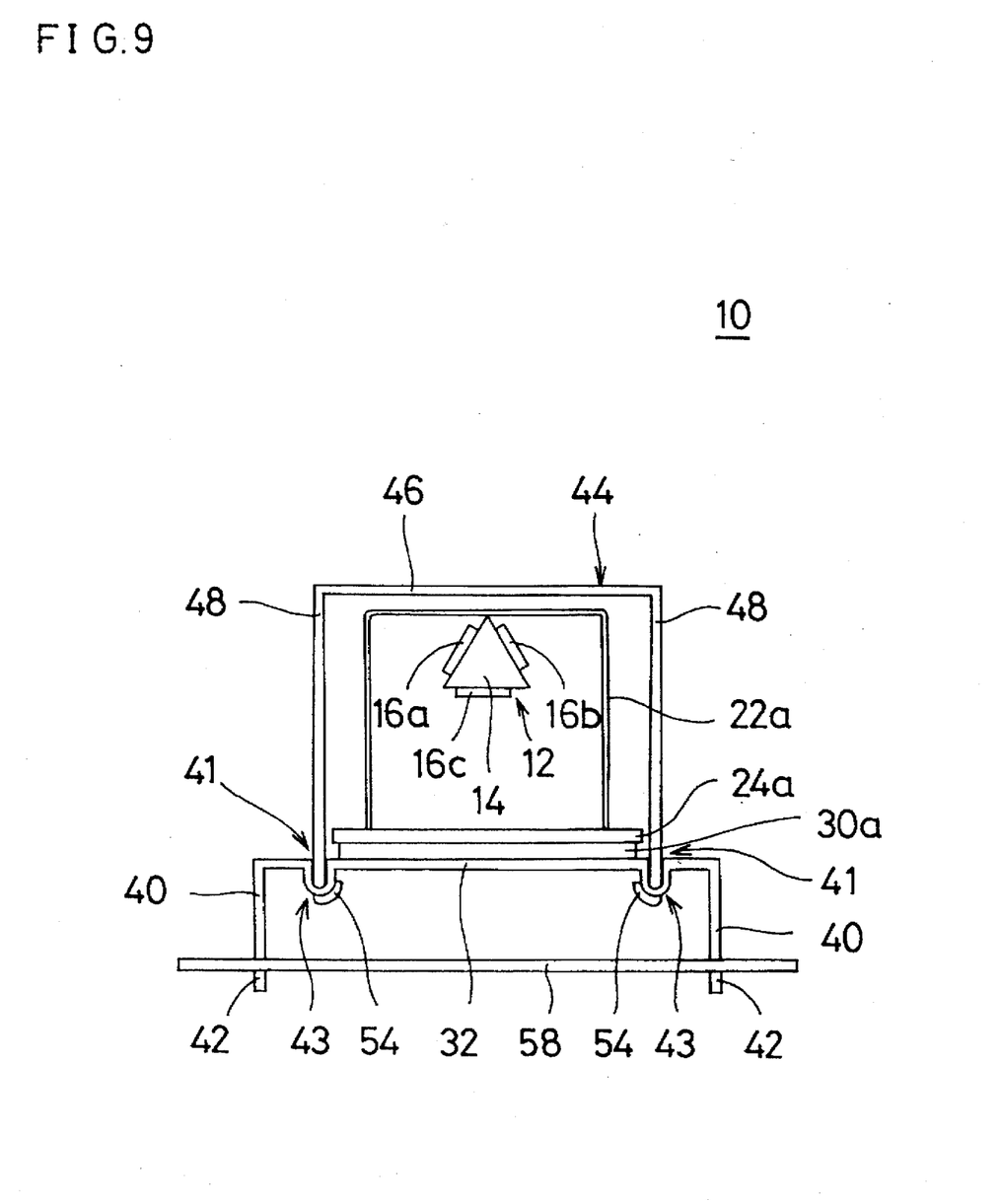
FIG. 9 is a front illustrative view showing an essential portion of the embodiment shown in FIG. 8.

FIG. 8 is an exploded perspective view showing an essential portion of still another embodiment of the present invention, FIG. 9 is a front illustrative view showing an essential portion of the embodiment shown in FIG. 8. The embodiment shown in FIG. 8 and FIG. 9, compared with the embodiment shown in FIG. 6 and FIG. 7, includes a wide work plate 32. Leg members 40 extended downward are respectively formed on both sides of a work plate 32. Projections 42 projected downward are respectively formed on both sides of bottom portions of the leg members 40.

Two grooves 41 are formed so as to extend from one end to the other end on one main surface of the work plate 32 by, for example, pressing. Two holes 43 are formed into the groove 41 at a fixed distance, the other two holes 43 are formed into the groove 41 at a fixed distance. Meanwhile, mounting boards 24a and 24b are secured between the two grooves 41 of the work plate 32 via cushion members 30a and 30b.

A work cover 44 is installed on the work plate 32. In this case, bottom ends of side members 48 of the work cover 44 are engaged with the grooves 41 of the work plate 32. Furthermore, projections 54 of the work cover 44 are engaged by inserting through the holes 43 of the work plate 32 thereafter bending. Thus, the work cover 44 is strongly installed on the work plate 32.

The work plate 32 is installed on one main surface of a circuit board 58. In this case, the projections 42 of the work plate 32 are secured by inserting through holes 60 formed on the circuit board 58 and by soldering to a ground pattern (not shown) on the other main surface of the circuit board 58. Thus, the work plate 32 is strongly installed on the circuit board 58.

In the vibrating gyroscope 10 shown in FIG. 8 and FIG. 9, since the work cover 44 is provided around the vibrator 12, even if an impact such as due to a fall is applied to the vibrator 12, a plastic strain is hardly generated between the vibrator 12 and the circuit board 58, for example, to the supporting members 22a and 22b. Thus, in the vibrating gyroscope 10, the output characteristic is stable against a large impact from the outside such as a fall, too.

Furthermore, in the vibrating gyroscope 10 shown in FIG. 8 and FIG. 9, since the work cover 44 is strongly secured to the work plate 32 and the work plate 32 is strongly secured to the circuit board 58, the work plate 32 and the work cover 44 are not moved or will not come off against a large impact from the outside such as a fall.

Meanwhile, though the work cover 44 is secured to the work plate 32 by inserting the projections 54 of the work cover 44 through the holes 43 of the work plate 32 thereafter bending and engaging in the embodiment shown in FIG. 8 and FIG. 9, it is not limited to the method, it may use another method such as welding, bonding, soldering or the like. Though the work plate 32 is secured to the circuit board 58 by soldering, it may use another method such as welding, bonding, or engaging by inserting the projections 42 provided on the work plate 32 through the holes of the circuit board 58 thereafter bending.

Though the regular triangular prism-shaped vibrating body 14 is used as a vibrating body of a vibrator in the above-mentioned each embodiment, another polygonal prism-shaped vibrating body such a rectangular prism-shaped vibrating body or a circular prism-shaped vibrating body may be used in the present invention.

Though three piezoelectric elements 16a–16c are formed on the side faces of the vibrating body 14 of the vibrator 12 in the above-mentioned each embodiment, two or more piezoelectric elements may be formed on the side faces of the vibrating body in the present invention.

Furthermore, a vibrating body of a vibrator may be formed with a piezoelectric material. In this case, an electrode may be formed on the side face of the vibrating body in place of the piezoelectric element.

It will be apparent from the foregoing that, while the present invention has been described in detail and illustrated, these are only particular illustrations and examples, and the invention is not limited to these. The spirit and scope of the invention is limited only by the appended claims.

TABLE 1

DROPPING THE EMBODIMENT VIBRATING GYROSCOPE FROM A HEIGHT OF 1 METER

| FALLING TIMES | 1 | 2 | 3 | 4 | 5 | 6 |
|---|---|---|---|---|---|---|
| OUTPUT AT STANDSTILL (V) | −4.4 | −3.8 | −3.0 | 2.2 | 0.8 | 1.2 |
| CHANGING RATE OF OUTPUT AT ROTATION (%) | −3.0 | −0.6 | −1.4 | −2.8 | 0.1 | 0.4 |

TABLE 2

| | DROPPING THE PRIOR ART VIBRATING GYROSCOPE FROM A HEIGHT OF 50 CENTIMETERS | | | | | |
|---|---|---|---|---|---|---|
| FALLING TIMES | 1 | 2 | 3 | 4 | 5 | 6 |
| OUTPUT AT STANDSTILL (V) | −4.5 | −3.0 | −3.8 | −4.2 | −5.0 | −5.5 |
| CHANGING RATE OF OUTPUT AT ROTATION (%) | −7.5 | −12.5 | DE-STROYED | DE-STROYED | DE-STROYED | DE-STROYED |

What is claimed is:

1. A vibrating gyroscope comprising:
a vibrating body;
a circuit board supporting said vibrating body;
a case containing said vibrating body and said circuit board therein; and
a cushion member, which acts as a cushion, provided between ends of said circuit board and an inside surface of said case, said cushion member formed with a recess and a groove extending outwardly from the recess wherein an end portion of said circuit board is inserted into said groove and an end portion of said work cover is inserted into said recess, wherein said circuit board does not touch said case.

2. A vibrating gyroscope according to claim 1, which further comprises a work cover provided to cover one side of said vibrating body, said work cover installed on said circuit board and contained in said case;
wherein said cushion member is provided between said circuit board, said work cover and said case.

3. A vibrating gyroscope according to claim 2, which further comprises a work plate provided to cover another side of said vibrating body, said work plate installed on said circuit board and contained in said case;
wherein said cushion member is provided between said circuit board, said work cover, said work plate and said case.

4. A vibrating gyroscope according to claim 1, wherein said cushion member is convex shaped.

5. A vibrating gyroscope according to claim 1, wherein said cushion member further comprises a second recess formed under said recess as a space for lead terminals.

6. A vibrating gyroscope comprising:
a vibrating body;
a work cover installed around a top and sides of said vibrating body;
a work plate installed around a bottom of said vibrating body, said work plate including longitudinal extending grooves extending between ends of said work plate and sides of said work cover are secured to said longitudinal extending grooves in said work plate; and
a circuit board to which said work plate is secured.

7. A vibrating gyroscope comprising:
a vibrating body;
a work cover installed around one side of said vibrating body;
a work plate installed around another side of said vibrating body;
a circuit board, wherein said work cover and said work plate are independently secured to different adjacent portions of said circuit board;
a case containing said vibrating body, said work cover, said work plate and said circuit board; and
cushion members which act as cushions, each cushion member provided between said case and one end portion of said work cover, work plate and circuit board, each cushion member formed with a recess and a groove extending outwardly from the recess wherein end portions of said circuit board are inserted into said grooves and end portions of said work cover are inserted into said recesses.

8. A vibrating gyroscope according to claim 7, wherein
said work cover has projections,
said work plate has projections,
said circuit board has holes, and
said projections of said work cover and said projections of said work plate are inserted through said holes of said circuit board.

9. A vibrating gyroscope according to claim 7, wherein said work cover and said work plate are welded to said circuit board.

10. A vibrating gyroscope according to claim 7, wherein said work cover and said work plate are bonded to said circuit board.

11. A vibrating gyroscope according to claim 7, wherein said work cover and said work plate are soldered to said circuit board.

12. A vibrating gyroscope according to claim 7, wherein said cushion members are convex shaped.

13. A vibrating gyroscope according to claim 14, wherein each said cushion member further comprises a second recess formed under said recess as a space for lead terminals.

14. A vibrating gyroscope comprising:
a vibrating body;
a work cover installed around a top and sides of said vibrating body;
a work plate installed around a bottom of said vibrating body, said work plate including longitudinal extending grooves extending between ends of said work plate and sides of said work cover are secured to said longitudinal extending grooves in said work plate;
a circuit board to which said work plate is secured;
a case containing said vibrating body, said work cover, said work plate, and said circuit board; and
a cushion member, which acts as a cushion, provided between said case and ends of said work cover, work plate and circuit board.

15. A vibrating gyroscope according to claim 14, wherein
said work cover has projections,
said work plate has projections and holes, said circuit board has holes, said projections of said work cover are inserted through said holes of said work plate, and said projections of said work plate are inserted through said holes of said circuit board.

16. A vibrating gyroscope according to claim 14, wherein said work cover is welded to said work plate, and
said work plate is welded to said circuit board.

17. A vibrating gyroscope according to claim 14, wherein said work cover is bonded to said work plate, and
said work plate is bonded to said circuit board.

18. A vibrating gyroscope according to claim 14, wherein said work cover is soldered to said work plate, and
said work plate is soldered to said circuit board.

* * * * *